R. MAX.
AIR HEATING CHAMBER FOR STOVES, FURNACES, AND OTHER HEATING APPARATUS.
APPLICATION FILED AUG. 13, 1906.
974,581.
Patented Nov. 1, 1910.
2 SHEETS—SHEET 1.
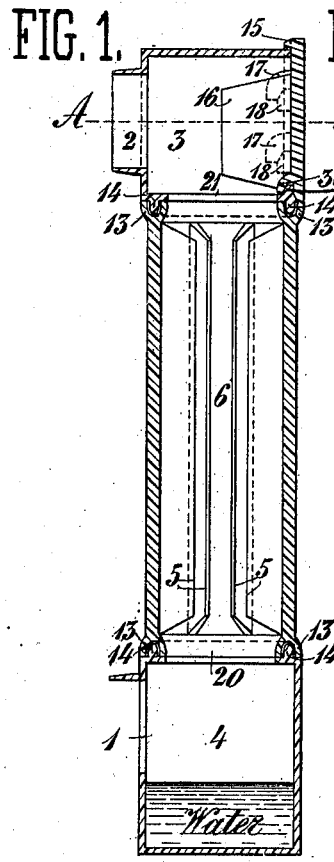
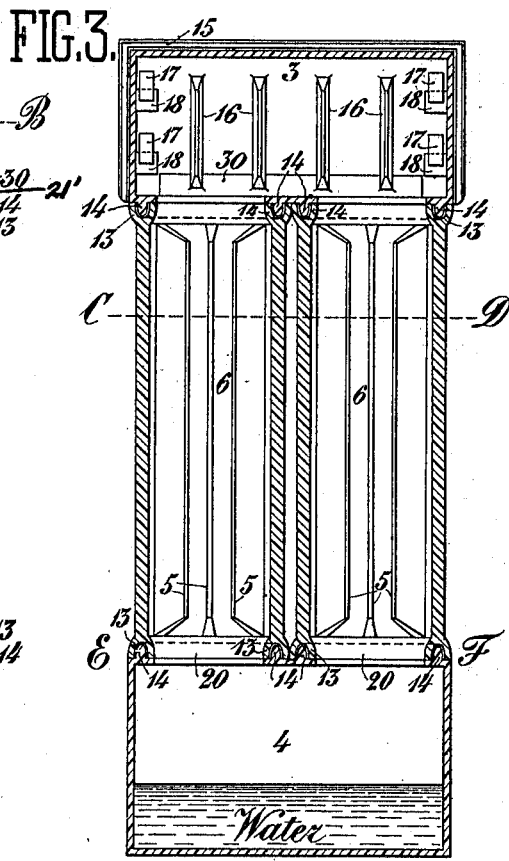
FIG. 6.
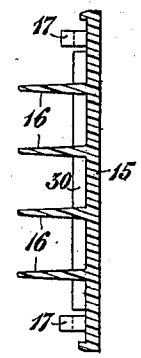
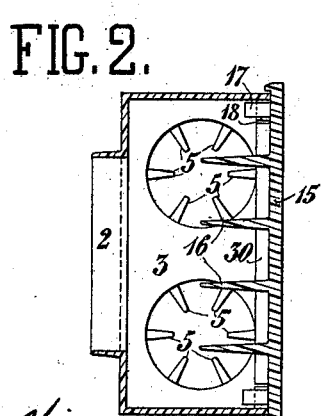
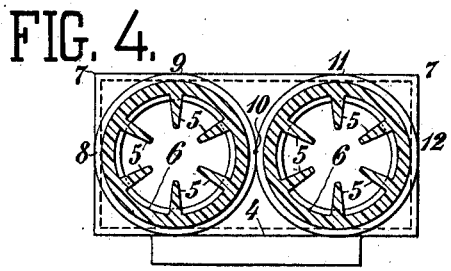
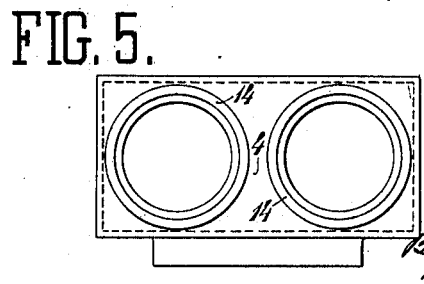

R. MAX.
AIR HEATING CHAMBER FOR STOVES, FURNACES, AND OTHER HEATING APPARATUS.
APPLICATION FILED AUG. 13, 1906.

974,581.

Patented Nov. 1, 1910.
2 SHEETS—SHEET 2.

UNITED STATES PATENT OFFICE.

ROMAN MAX, OF WARSAW, RUSSIA.

AIR-HEATING CHAMBER FOR STOVES, FURNACES, AND OTHER HEATING APPARATUS.

974,581.             Specification of Letters Patent.        Patented Nov. 1, 1910.

Application filed August 13, 1906. Serial No. 330,506.

*To all whom it may concern:*

Be it known that I, ROMAN MAX, residing at 29 Tielna street, Warsaw, Poland, Russia, have invented certain new and useful Improvements in Air-Heating Chambers for Stoves, Furnaces, and other Heating Apparatus; and I do hereby declare the following to be a full, clear, and exact description of the invention, such as will enable others skilled in the art to which it appertains to make and use the same.

My invention relates to improvements in air heating chambers for stoves and furnaces and has for its object to make use of that type of air heating tube which is provided with radially projecting webs or plates, in combination with end chambers in communication with the atmosphere as hereinafter described.

Figure 7:
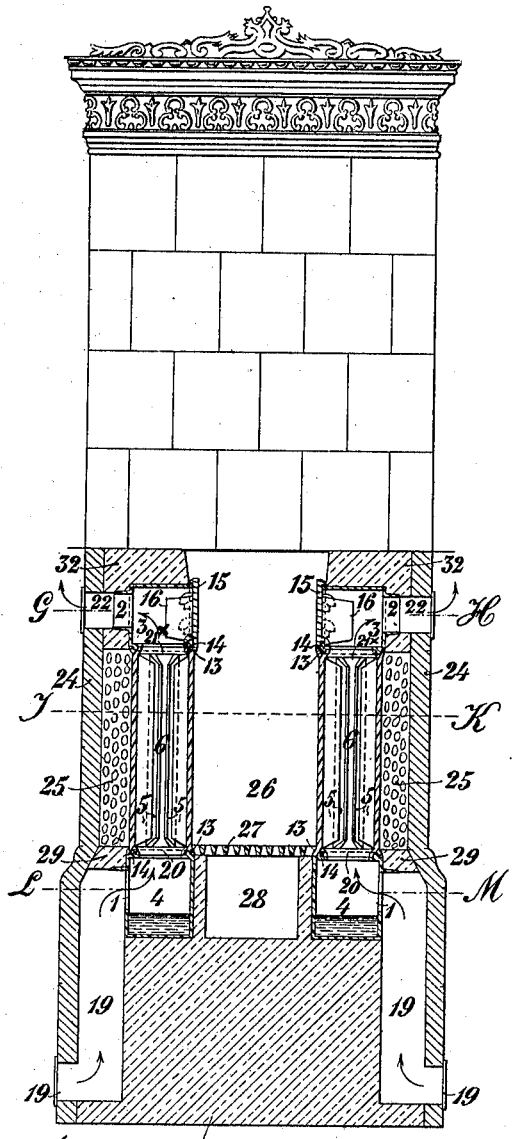
Figure 8:
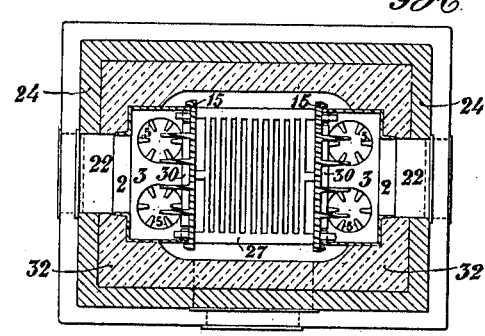
Figure 9:
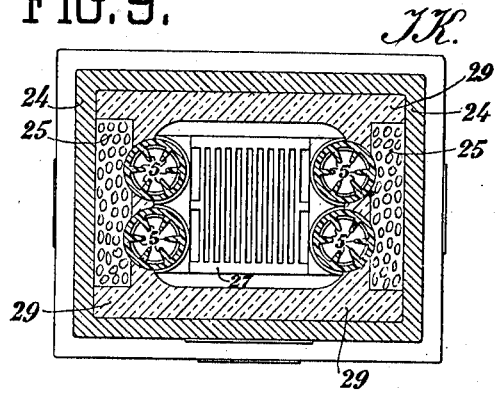
Figure 10:
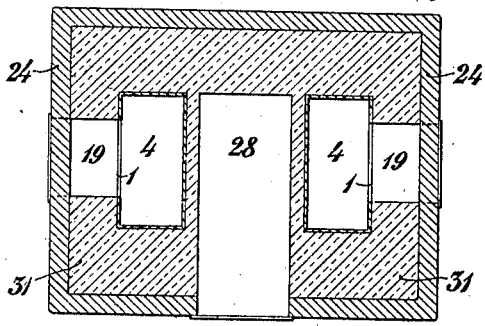

In the drawings:—Figure 1 is a vertical sectional view of the air heating chamber. Fig. 2 is a horizontal section of same on line A—B, Fig. 1. Fig 3 is also a vertical longitudinal section but at right angles to Fig. 1. Fig. 4 is a horizontal section along line C—D, Fig. 3. Fig. 5 is a plan view of the bottom chamber. Fig. 6 is a horizontal section of the removable front wall. Fig. 7 is a section illustrating my invention applied to a heating stove. Figs. 8, 9 and 10 are sections of Fig. 7 on lines G—H, I—K, L—M, respectively.

The general construction of the air-heating chamber is the usual one, viz, the air to be heated enters the chamber through an aperture 1, passes through the chamber, sweeps over the heated surface and is let out again at the top through the aperture 2 entering the room as heated air. The air-heating chamber consists, according to this invention, of three parts, namely, the top 3, the bottom 4, and the suitable air heaters 6 which are arranged in juxtaposition in any desired number, between the two parts 3 and 4. The air heater itself, as shown, has the shape of a tube made of metal, for instance of iron, and is furnished inside with ribs 5, the known function of which is to increase the surface so as to facilitate the absorption of heat by the air to be heated.

The ends 13 of the tubes are given a trough-like shape while the lower end of part 3 and upper end of part 4 are provided with ridges 14 which fit in the trough-shaped grooves of the tube-ends 13. This alone produces tight fitting which with the aid of a cement, or of any other mode of jointing, can be made absolutely air-tight. The bottom 4 has an inlet 1 for the air to be heated. The top 3 has the outlet 2. The result is a great saving in the wear and a protection of the air-heating chamber against the action of the fire, as compared with the air-heating chambers of the old type, because of the whole metallic surface of the air-heating chamber, only about one-half is exposed to the direct action of the fire. Owing to the easy distribution of heat due to the metal, first of all, the side of the tubes removed from the fire is also brought to an intense heat and consequently used to heat the air while at the same time excessive heating of the side of the tube exposed to the fire is avoided, and hence any rapid wear is prevented. Nevertheless it is advisable to have means of removing the air-heating pipes from time to time. For that purpose the top part 3 is furnished with a front wall 15 turned toward the fire (Figs. 1, 2, 6, 8) which is arranged so as to be capable of being easily removed and the grooves of which are made air-tight by a cement. Said front wall is also provided with ribs 16 disposed at the back, viz, toward the interior of the chamber, along which the air issuing from tubes 6 circulates and becomes further heated. The wall 15 is held in position by hooks 17 engaging with lugs 18 on the walls of the upper chamber. In the event of an air-heating chamber having become damaged, the front wall 15 of the top 3 can be easily removed and the whole top can be raised for the purpose of taking out the air-heating tube which is damaged and replacing it. The lower edge of the wall 15 has a flange 30 engaging over an upwardly projecting flange 21' on the bottom 21 of the upper chamber.

In the stove shown in Figs. 7, 8, 9 and 10, the passages 19, 19 are arranged to admit the air to be heated; 4, 4 are the bottom chambers, partly filled with water, for the purpose of imparting the necessary moisture to the air to be heated, which air flows from the passages 19, 19 through openings 1, 1 in the walls of the chambers 4, 4, into these chambers and from here through the openings 20, 20, into the air-heating tubes 6. The heated air then passes through openings $21^x$, $21^x$, into the chambers 3, 3, and from there through the side openings 2, 2, and outlet passages 22, 22 into the room.

24, 24 is the usual wall of the stove, 25, 25 is the broken stone layer for the better retaining and storing up of heat, situated next to the wall of the stove behind the air pipes; 26 is the fire-pot, 27 the grate bars, 28 the ash-box, 29 brick division, and 31, 32 brick or other filling.

The use of the radially webbed pipe is only possible if this pipe is in one piece, i. e., without joints, so that it need only be protected from the fire gases at the top and at the bottom, which as may be seen from the drawings, can be easily effected. The position of the joints of the upper and lower edge of my air heating tubes are chosen so that the lower joint is arranged somewhat below the grate bars 27, Fig. 7, and does not come into contact with the fire gases; on the other hand the upper joint is sufficiently removed from the fire to be protected from the fire gases.

I claim:—

An air-heating chamber for stoves, furnaces and the like comprising pipes with internal radial webs, each of said pipes being provided with trough-shaped grooves, a bottom chamber upon which said pipes are mounted, said bottom chamber being provided at its upper end with ridges fitting in the grooves in the bottoms of the said pipes, a top chamber mounted upon the upper ends of said pipes, the lower end of said top chamber having ridges fitting in the grooves in the upper ends of the pipes, and a removable front wall 15 for the top chamber, said front wall having ribs 16 disposed toward the interior of the top chamber, said top and bottom chambers being open to the atmosphere, as described.

In testimony whereof, I affix my signature, in presence of two witnesses.

ROMAN MAX.

Witnesses:
 CYRYL TREDNICKI,
 EUGENJURS JÓSEFOWICSKY.